United States Patent [19]
Collins et al.

[11] Patent Number: 5,764,953
[45] Date of Patent: Jun. 9, 1998

[54] COMPUTER IMPLEMENTED SYSTEM FOR INTEGRATING ACTIVE AND SIMULATED DECISIONMAKING PROCESSES

[75] Inventors: John E. Collins, Hudson, Wis.; Elizabeth M. Sisley, Woodbury, Minn.

[73] Assignee: Minnesota Mining and Manufacturing Company, St. Paul, Minn.

[21] Appl. No.: 469,760

[22] Filed: Jun. 6, 1995

Related U.S. Application Data

[63] Continuation of Ser. No. 220,831, Mar. 31, 1994, abandoned.

[51] Int. Cl.$^6$ ........................................... G06F 9/455
[52] U.S. Cl. ................... 395/500; 395/570; 395/850.43
[58] Field of Search ................................. 395/800, 500, 395/375, 800.43, 570

[56] References Cited

U.S. PATENT DOCUMENTS

| | | | |
|---|---|---|---|
| 4,796,194 | 1/1989 | Atherton | 364/468 |
| 4,937,743 | 6/1990 | Rassman et al. | 364/401 |
| 4,965,743 | 10/1990 | Malin et al. | 364/513 |
| 5,099,431 | 3/1992 | Natarajan | 364/468 |
| 5,241,465 | 8/1993 | Oba et al. | 364/401 |
| 5,305,221 | 4/1994 | Atherton | 364/468 |
| 5,325,292 | 6/1994 | Crockett | 364/401 |

OTHER PUBLICATIONS

A. V. Hill and D. C. Whybark, "Chexpedite: A Computer--Based Approach to the Bank Courier Problem," *Decision Sciences*, vol. 13, No. 2, Apr. 1982, pp. 251–265.

M. S. Fox and S. F. Smith, "ISIS—a knowledge-based system for factory scheduling," *Expert Systems*, vol. 1, No. 1, 1984, pp. 25–49.

A. V. Hill and D. C. Whybark, "Comparing Exact Solution Procedures for the Multi-Vehicle Routing Problem," *The Logistics and Transporation Review*, vol. 12, No. 3, 1976, pp. 145–153.

T. Dean and M. Boddy, "An Analysis of Time–Dependent Planning," in Proceedings of the Seventh National Conference on Artificial Intelligence, A.A.A.I., 1988, pp. 49–54.

H. Berliner and G. Goetsch, "A Study of Search Methods: The Effect of Constraint Satisfaction and Adventurousness," in Proceedings of the Ninth International Joint Conference on Artificial Intelligence, vol. 2, Aug. 18–23, 1985, pp. 1079–1082.

A. V. Hill, J. D. Naumann, and N. L. Chervany, "SCAT and SPAT: Large–Scale Computer–Based Optimization Systems for the Personnel Assignment Problem", *Decision Sciences*, vol. 14, No. 2, Apr. 1983, pp. 207–220.

B. Kalantari, A. V. Hill, and S. R. Arora, "An algorithm for the traveling salesman problem with pickup and delivery customers," *European Journal of Operational Research*, vol. 22, No. 3, Dec., 1985, pp. 377–386.

A. V. Hill, "An Experimental Comparison of Dispatching Rules for Field Service Support," *Decision Sciences*, vol. 23, No. 1, Winter 1992, pp. 235–249.

(List continued on next page.)

*Primary Examiner*—William M. Treat
*Assistant Examiner*—Zarni Maung
*Attorney, Agent, or Firm*—Kent J. Sieffert

[57] ABSTRACT

A system that integrates active and simulated decisionmaking processes generates decisions in response to events representing changes in a domain model, and updates the domain model according to the decisions. The system includes a real-time mode for generating recommendations in response to real-time events, and a simulation mode for generating recommendations in response to simulated events. The simulation mode is capable of running on either randomly generated domain events or real-time domain events captured during the real-time mode. In addition, the simulation mode does not require development of a separate domain model for simulation. Rather, the simulation mode may use the contents of a domain model established during the real-time mode. Integration of an active decisionmaking tool with a simulation tool thereby eliminates the cost of constructing a separate simulation model, and avoids invalidation of the contents of the simulation model over time.

45 Claims, 6 Drawing Sheets

OTHER PUBLICATIONS

D. Whitley, T. Starkweather, and D. Shaner, "The Traveling Salesman and Sequence Scheduling: Quality Solutions Using Genetic Edge Recombination," *Handbook of Genetic Algorithms*, Chapter 22, 1991, pp. 350–372.

M. Zweben, M. Deale, and R. Gargan, "Anytime Rescheduling," in Proceedings of a Workshop on Innovative Approaches to Planning, Scheduling and Control, San Diego, Calif., Nov. 5–8, 1990, pp. 251–259.

A. V. Hill, V. A. Mabert, and D. W. Montgomery, "A Decision Support System for the Courier Vehicle Scheduling Problem," *OMEGA Int. J. of Mgmt Sci.*, vol. 16, No. 4, 1988, pp. 333–345.

H. Prade, "Using Fuzzy Set Theory in a Scheduling Problem: A Case Study," *Fuzzy Sets and Systems*, vol. 2, No. 2, 1979, pp. 153–165.

M. S. Fox, N. Sadeh, and C. Baykan, "Constrained Heuristic Search," in Proceedings of the Eleventh International Joint Conference on Artificial Intelligence (IJCAI), Detroit, Mich., vol. 1, Aug. 20–25, 1989, pp. 309–315.

W. Chiang and M. S. Fox, "Protection Against Uncertainty in a Deterministic Schedule," in Proceedings of the Fourth International Conference on Expert Systems in Production and Operations, Management, Hilton Head, South Carolina, May 1990, pp. 184–186.

M. Zweben, "Contraint–Based Simulated Annealing: An Iterative Improvement Framework for Constraint Satisfaction Search," NASA Ames Research Center, Moffett Field, California, Aug. 9, 1990, pp. 1–13.

R. Hublou, "Manufacturing Operations Scheduling," *Business Intelligence Program Report D90–1436*, SRI International, May 1990, pp. 1–39.

A. V. Hill, "An Experimental Comparison of Human Schedulers and Heuristic Algorithms for the Traveling Salesman Problem," *Journal of Operations Management*, vol. 2, No. 4, Aug. 1982, pp. 215–223.

P. Prosser, "A Reactive Scheduling Agent," i Proceedings of the Eleventh International Joint Conference on Artificial Intelligence, Detroit, Michigan, Aug. 20–25, 1989, pp. 1004–1009.

E. Ghalichi and J. Collins, "The Dispatch Adivsor," in Proceedings of the Workshop on Artificial Intelligence for Customer Service and Support, Eighth IEEE Conference on Artificial Intelligence Applications, Monterey, California, Mar. 3, 1992, pp. 60–68.

J. E. Collins and E. M. Sisley, "AI in Field Service: The Dispatch Advisor," in Working Notes, AI in Service and Support: Bridging the Gap Between Research and Applications, Eleventh National Conference on Artificial Intelligence, Washington, D.C., Jul. 11–15, 1993, pp. 26–37.

J. Tsitsiklis, "Special Cases of Traveling Salesman and Repairman Problems with Time Windows," Report LIDS–P–1987, Massachusetts Institute of Technology, Jun. 1990, pp. 1–23.

S. F. Smith, "The OPIS Framework for Modeling Manufacturing Systems," Tech Report CMU–RI–TR–89–30, Carnegie–Mellon University, Dec. 1989, pp. 1–56.

D. L. Haugen, "A Study of Scheduling and Quality of Field–Service Support Systems," Ph.D. Thesis, University of Minnesota, Nov. 1993, pp. 1–251.

M. H. MacDougall, "Simulating Computer Systems, Techniques and Tools," Chapter 1, The MIT Press, 1987, pp. 1–21.

Implementation issues using simulation for real–time scheduling, control, and monitoring, by Harmanoly, IEEE P–P–595, 1990.

Simulation–Based analysis for real–time development by Sheldon, IEEE, 1992, pp. 361–366.

Extending the DEVS, Scheme knowledge–Based simulator Environment for real–time Event–Based control, by Zeisler, 1993 IEEE, pp. 351–356.

Simulation analysis of Real–time task scheduling by Fortier et al. 1994 IEEE pp. 563–570.

Task assignment and scheduling on fault–tolerant distributed real–time systems by Lin et al., IEEE pp. 165–168.

A simulation–based work order release mechanism for a flexible manufacturing system by Muller et al. pp. 599–602.

5,764,953

COMPUTER IMPLEMENTED SYSTEM FOR INTEGRATING ACTIVE AND SIMULATED DECISIONMAKING PROCESSES

This is a continuation of application Ser. No. 08/220,831 filed Mar. 31, 1994 now abandoned.

FIELD OF THE INVENTION

The present invention relates to decisionmaking systems and, more particularly, to active decisionmaking systems operative relative to a changing domain.

DISCUSSION OF RELATED ART

A decisionmaking domain can be defined, in the abstract, by a plurality of diverse object sets and a relational set defining relationships between one or more of the objects. In dynamic problem environments, the state of the decisionmaking domain undergoes frequent change. An active decisionmaking system responds to such change by generating decisions based on predefined criteria. The decisions represent modification of the relational set as dictated by a function of the change and the criteria. In structured organizations, changes to the decisionmaking domain often result from changes in organizational policy or structure. Organizational changes that alter the domain may significantly change the appropriateness of decisions issued by the decisionmaking system. Alternatively, carefully planned changes may improve overall efficiency in the problem environment.

Simulation is acknowledged as a valuable tool for evaluating the effects of organizational change. Unfortunately, the use of existing simulation tools can be very expensive, and of limited value. Specifically, simulation requires the development of a detailed model of the decisionmaking domain. However, the cost of building a domain model for many organizations outweighs the benefits of the simulation, due to organizational size and complexity. Even if the cost of building a domain model is incurred for use in a dedicated simulation tool, the result is a static model that serves no purpose outside of simulation. Moreover, organizational changes quickly invalidate the domain model, undermining the accuracy and relevance of subsequent simulation runs. Without confidence in the relevance of the domain model, simulation results provide a questionable measure of organizational improvement. Consequently, the benefits derived from simulation can be extremely short-lived, making it difficult to justify the initial effort required to build the domain model.

One example of a decisionmaking problem involves the assignment and scheduling of resource requests among a plurality of resource providers. The resource requests and resource providers form the object sets of the decisionmaking domain for the assignment and scheduling problem, whereas the relational set is defined by assignments of resource requests to appropriate resource providers, and scheduling of the resource requests at particular times. A manifestation of the assignment and scheduling problem is evident in a field service organization. A field service organization is characterized by a group of service technicians dedicated to the repair and maintenance of a variety of industrial machines, office equipment, and the like. The service technician travels to the customer's location to perform preventative maintenance and to provide repair services in response to customer service calls. Thus, in a field service environment, the technicians function as resource providers, providing maintenance and repair services, and both customer service calls and preventative maintenance appointments serve as resource requests. A service call dispatcher typically is responsible for the decisionmaking function of assigning and scheduling incoming service calls among the technicians. The dispatcher may distribute the calls based on her own judgment or with the aid of automated dispatching software. In either case, to render an acceptable assignment and scheduling decision, various dynamic characteristics of the field service domain should be considered.

Domain characteristics relevant to the assignment and scheduling decision may include, for example, the types of service activities requested by particular service calls, the types of service activities available from individual service technicians, the customer locations associated with particular service calls, preferred service territories associated with individual technicians, previous assignments of pending service calls, and previously scheduled times for the pending service calls. Changes in the policy or structure of the field service organization may cause changes to the dynamic resource domain. An organization may, for example, transfer technicians to different territories, update technician training profiles, or change overtime scheduling policies. The changes may drastically affect the appropriateness of the decisions issued by either the service call dispatcher or automated dispatching software, or result in improvements in assignment and scheduling efficiency. Simulation would be a valuable tool in evaluating the effects of such changes. Accordingly, there is a need for a simulation tool that reduces the cost of building the domain model, and readily-maintains the currency of the domain model to reflect organizational changes.

SUMMARY OF THE INVENTION

In view of the shortcomings of existing simulation tools, the present invention is directed to a system that integrates active and simulated decisionmaking processes.

Additional features and advantages of the invention will be set forth in part in the description that follows, and in part will be apparent from the description, or may be learned by practice of the invention. The advantages of the invention will be realized and attained by the system particularly pointed out in the written description and claims hereof, as well as in the appended drawings.

To achieve the foregoing advantages, as broadly embodied and described herein, the present invention provides a computer-implemented system for integrating active and simulated decisionmaking processes, the system comprising a storage device storing a representation of a domain model, the domain model representing a decisionmaking domain, and the decisionmaking domain containing a plurality of diverse object sets and a relational set defining relationships between one or more of the objects in the diverse object sets, a decisionmaking module for generating decisions in response to domain events, each of the domain events representing a change to one of the diverse object sets, and each of the decisions representing a change to the relational set, a system interface for receiving real-time events, each of the real-time events representing an actual change to one of the diverse object sets, a simulated event generator module for generating simulated events, each of the simulated events representing a simulated change to one of the diverse object sets, andan event processor module including means for receiving the real-time events from the system interface and the simulated events from the simulated event generator module, means for selecting one of a real-time mode of operation and a simulation mode of operation, means for passing one or more of the real-time events to the decisionmaking module as domain events when the real-time mode is selected, and for passing one or more of the simulated events to the decisionmaking module as domain events when the simulation mode is selected, and means for updating the relational set of the domain model stored in the storage device to include the changes represented by the decisions generated by the decisionmaking module.

It is to be understood that both the foregoing general description and the following detailed description are exemplary and explanatory only, and not restrictive of the invention, as claimed.

The accompanying drawings are included to provide a further understanding of the invention and are incorporated in and constitute a part of this specification. The drawings illustrate exemplary embodiments of the invention and together with the description serve to explain the principles of the invention.

DETAILED DESCRIPTION OF THE PREFERRED EMBODIMENTS

Reference will now be made in detail to exemplary embodiments of the invention. One skilled in the art, given the description herein, will recognize the utility of the system of the present invention in a variety of contexts in which decisionmaking problems exist. For example, it is conceivable that the system of the present invention may be adapted to decisionmaking domains existent in organizations engaged in activities such as telecommunications, power generation, traffic management, medical resource management, transportation dispatching, emergency services dispatching, inventory management, and logistics. However, for ease of description, as well as for purposes of illustration, the present invention primarily will be described in the context of a resource environment in which assignment and scheduling problems exist and, in particular, a field service environment.

Figure 1:
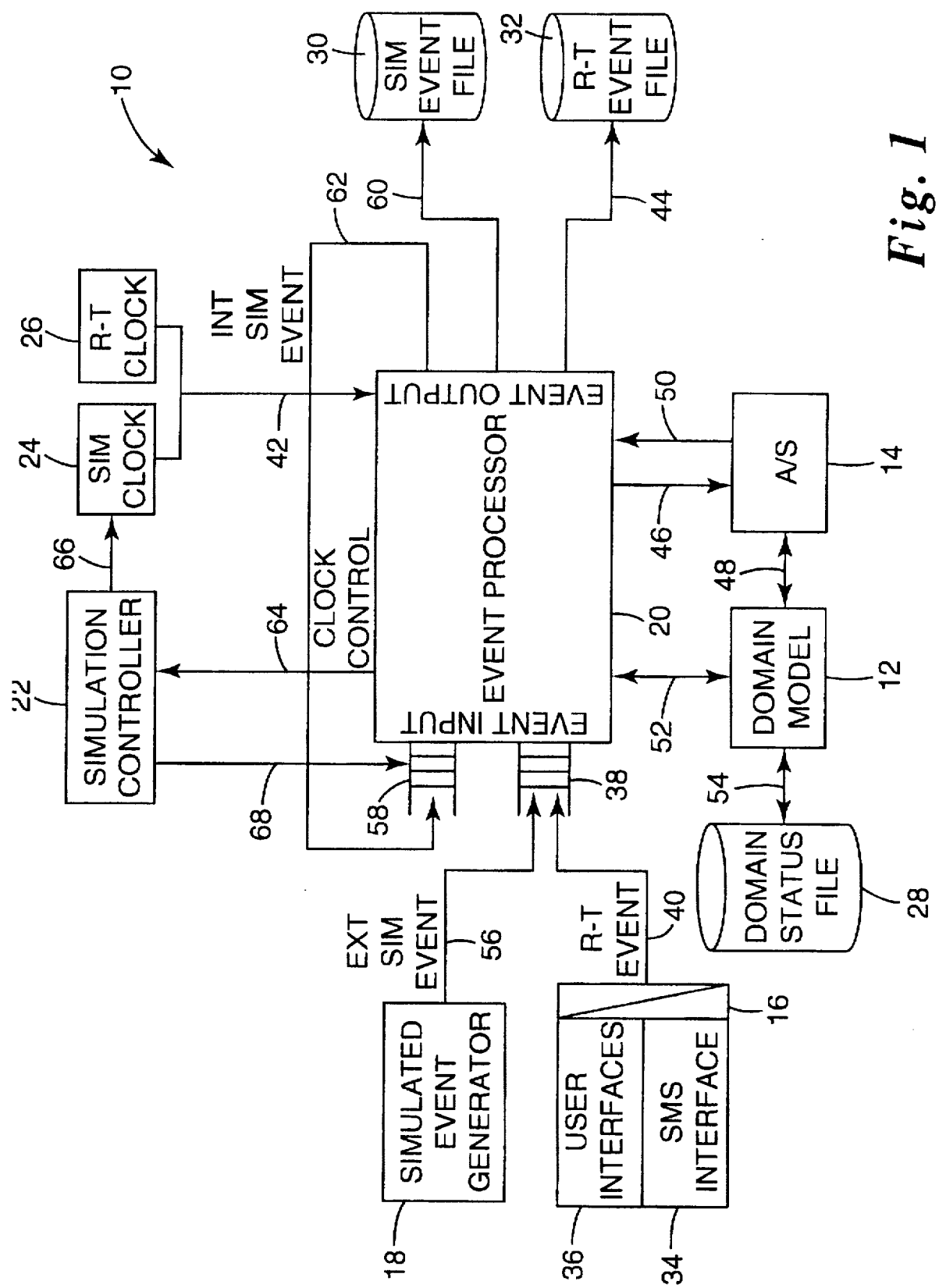
FIG. 1 is a block diagram illustrating a first embodiment of a system for integrating active and simulated decisionmaking processes, in accordance with the present invention.

FIG. 1 is a block diagram of a first embodiment of a system for integrating active and simulated decisionmaking processes in accordance with the present invention. The system 10 of FIG. 1 is a computer-implemented software system realized, for example, by a software process running on a standard Unix™ workstation. The software process of system 10 may be implemented with the Common Lisp Object System (CLOS). As illustrated in FIG. 1, system 10 comprises a storage device 12 storing a representation of a domain model, a decisionmaking module 14, a real-time system interface 16, a simulated event generator module 18, and an event processor module 20. The system 10 further comprises a simulation controller module 22, a simulation clock 24, a real-time clock 26, a resource domain status file 28, a simulated event file 30, and a real-time event file 32.

The domain model contained in storage device 12 of FIG. 1 represents a decisionmaking domain. The decisionmaking domain is defined by a plurality of diverse object sets and a relational set defining relationships between one or more of the objects in the diverse object sets. In a resource environment, the domain model in storage device 12 can be defined by a data structure containing three basic representational sets having dynamic attributes subject to change over time. Specifically, the domain model contains a first object set defined by a plurality of resource providers, a second object set defined by a plurality of resource requests, and a relational assignment set representing the assignment of one or more resource requests among individual resource providers. The assignment set includes a schedule set further defined by schedules of the resource requests assigned to each resource provider. In the field service context, the corresponding representational sets are a technician set defined by a plurality of field service technicians operating in the field service environment, a call set defined by a plurality of customer service calls requiring maintenance or repair services, an assignment set defined by a plurality of assignments of calls to technicians, and a schedule set defined by schedules of the calls assigned to each technician.

The decisionmaking module 14 generates decisions in response to domain events. Each of the decisions represents a modification to the relational set, whereas each of the domain events represents a change to one of the diverse object sets. In a resource environment, decisionmaking module 14 may comprise an assignment and scheduling (A/S) module that generates assignment and scheduling recommendations in response to domain events representing incremental changes in the state of the resource domain model in storage device 12. Thus, system 10 may be adapted to various decisionmaking domains by incorporating an appropriate decisionmaking tool in place of module 14. With necessary interface development, it is conceivable that diverse decisionmaking tools effectively could be "plugged into" system 10 according to the user's requirements.

The A/S module 14 initiates a constrained search for potential assignment and scheduling solutions and returns the best solution found to the system user as a recommendation. In the field service context, an incremental change to the resource domain model may take the form of a tech-event representing a change to the technician set such as a technician attribute change, or a call-event representing a change to the call set such as a call attribute change, the addition of a new call, or the cancellation of a pending call. The A/S module 14 may also resume a search in response to a request for reevaluation of the outstanding recommendation for a particular technician or call.

The recommendations generated by A/S module 14 represent modifications to the assignment and schedule sets contained in the resource domain model in storage device 12. In operation, A/S module 14 activates two software process modules that cooperate to reach an assignment/ scheduling recommendation. Specifically, A/S module 14 comprises an assigner module, responsible for assigning new and pending service calls among the technicians, and a scheduler module, invoked by the assigner module to generate a schedule of the calls assigned to each individual technician. The A/S module 14 combines optimization, artificial intelligence, and constraint-processing techniques to arrive at near-optimal recommendations. The structure and operation of A/S module 14 are described in detail in copending U.S. patent application Ser. No. 08/201,664, of Elizabeth M. Sisley and John E. Collins, filed Feb. 25, 1994, and entitled "SYSTEM AND METHOD FOR RESOURCE ASSIGNMENT AND SCHEDULING," the content of which is incorporated herein by reference.

As described in the aforementioned copending U.S. patent application Ser. No. 08/201,664, the assigner module searches for potential assignments of service calls among the service technicians, and evaluates a portion of an objective function relating to the desirability of particular associations of calls and technicians. The assigner module invokes the scheduler module to search for potential schedules of the calls assigned to a particular technician, and then to evaluate a portion of the objective function relating to time. Each of the potential schedules searched by the scheduler module represents a sequence of the service calls in finite time intervals. Thus, a complete assignment of a service call involves both an association of the call with a technician, as determined by the assigner module, and a scheduling of the call at a particular time, as determined by the scheduler module.

In accordance with the present invention, system 10 is capable of triggering the assignment and scheduling activity of A/S module 14 with either real-time domain events or simulated domain events, thereby providing an active, real-time mode and a discrete-event simulation mode. The real-time domain events represent actual changes to either the technician set or call set, as received from the real world, whereas the simulated domain events represent simulated changes generated for purposes of running the simulation. The A/S module 14 receives real-time domain events during the real-time mode of operation, and receives simulated domain events during the simulation mode. In either mode of operation, however, A/S module 14 returns an A/S recommendation in normal course.

The discrete-event simulation mode of system 10 may operate on either randomly generated domain events or stored domain events captured during the real-time mode. In addition, the simulation mode does not require development of a separate simulation model. Rather, the simulation mode uses the same resource domain model developed for use in the real-time mode. As the structure of the resource domain model in storage device 12 is altered due to organizational changes, the simulation mode remains relevant and up-to-date. Thus, integration of active and simulation tools eliminates the initial cost of constructing a separate simulation model, and avoids invalidation of the simulation model over time.

The event processor module 20 selects either the real-time mode or the simulation mode based on selections by system users. For example, system users can select the real-time mode to conduct active assignment and scheduling for technicians in the field. The simulation mode can be selected to evaluate the effects of potential changes to the resource domain model, to compare recommendations issued by A/S module 14 with decisions made by system users, or to provide training for system users. The structure of system 10 is described herein as being implemented by a single machine providing separate real-time and simulation modes. However, if a system user desires to retain real-time assignment and scheduling capability during a simulation run, the simulation can be performed on a different machine, or as a separate process running on the same machine.

The operation of system 10 in the real-time mode will now be described. The simulated event generator module 18, simulation controller module 22, and simulation clock 24 remain idle during the real-time mode. Consequently, the only input for the real-time mode comes from the real world. The real-time system interface 16 serves as the link to the real world, passing real-time domain events to event processor module 20. As shown in FIG. 1, real-time system interface 16 includes SMS interface 34, which captures real-time SMS event data from a service management system (SMS) database, and one or more interactive user interfaces 36, which receive real-time field event data entered by system users.

The SMS event data is generated with an SMS software application designed to track service calls received from customers. Examples of commercially available SMS software systems are the S2000™ system manufactured by Service Systems International, and the OPEN UPTIME™ system manufactured by Metrix. When a customer requests repair services, a system user working for the service organization uses the SMS software application to enter new calls and accompanying call attributes provided by the customer into the SMS database. The system user deletes a call from the SMS database when the customer reports a cancellation. The SMS application may also add a call to the SMS database in response to call information received directly from a customer, or repair signals received from a malfunctioning machine. The SMS event data captured by the SMS interface 34 constitute call-events representing incremental changes to the call set. The SMS interface 34 translates the captured event data into domain events for A/S module 14.

The field event data received by user interfaces 36 comprise both tech-events and call-events, representing changes to the technician and call sets, respectively, as entered by system users in response to changes in the field. The field event data generally result from notification by technicians or other field personnel, and include a change in call attributes or a change in technician attributes. Like the SMS interface 34, the user interfaces 36 translate the real-time field event data received from system users into domain events to trigger A/S module 14.

The real-time system interface 16 passes the real-time domain events received from SMS interface 34 and user interfaces 36 to a queue 38 associated with event processor module 20, as indicated by line 40. In FIG. 1, the real-time domain events generated by system interface 16 are denoted by the label "R-T EVENT." The queue 38 is provided to linearize the asynchronous real-time events received from system interface 16. By queueing the events, event processor module 20 can process them one-at-a-time without overlap to avoid conflicts in recommendations issued by A/S module 14. The events in queue 38 preferably are priority-ordered based on relative priorities associated with each type of event. The external events having the highest priorities are dequeued from priority-ordered queue 38 first. Events having the same priority may be ordered in a first-in-first-out manner, such that the event received first is dequeued first. The event processor module 20 affixes to each real-time event dequeued from priority-ordered queue 38 a time-stamp reflecting the current time. The real-time clock 26 passes the current time to event processor module 20, as indicated by line 42. The event processor module 20 then records the time-stamped event in an event record stored in real-time event file 32, as indicated by line 44. The real-time event file 32 contains a sequence of time-stamped event records received by event processor module 20 over a period of time, providing a source of captured events for use in the simulation mode.

The event processor module 20 also processes each event dequeued from priority-ordered queue 38 by invoking a handle-event function that determines an appropriate course of action based on the type of tech-event or call-event received. Examples of various types of call-events received by SMS interface 34 and user interfaces 36 include: (1) a new-call-event representing a new incoming call received from the SMS interface 34, (2) a cancel-call-event representing the cancellation of a pending call, (3) a reevaluate-call-event representing a request for further consideration of the outstanding recommendation for a particular call, and (4) a change-call-event representing a change to any of a variety of call attributes, such as the type of machine involved. Examples of various types of tech-events received by user interfaces 36 include: (1) an assignment-event representing the commitment of a recommended call to a technician, (2) an unassignment-event representing the retraction of a committed assignment from a technician, (3) a clear-call-event representing the completion of a call by a technician, and triggering the start of the next scheduled call, (4) a change-territory-coverage-event representing a change in the preferred service territory for a technician, (5) an add-unavailable-time-event representing an appointment rendering a particular technician unavailable, and (6) a reevaluate-tech-event representing a request for further consideration of the outstanding recommendation for a particular technician.

Each type of tech-event or call-event is associated with an action specified by the handle-event function. For example, when a new-call-event, cancel-call-event, unassignment-event, reevaluate-call-event, or reevaluate-tech-event is dequeued from priority-ordered queue 38, event processor module 20 passes it to A/S module 14, with the relevant time-stamp and attributes, for an assignment and scheduling recommendation; as indicated by line 46. In response, A/S module 14 accesses the resource domain model in storage device 12 to ascertain the status of the prevailing technician, call, and assignment sets, as indicated by line 48. The A/S module 14 then initiates a constrained search for assignment and scheduling solutions, and returns the best solution found to event processor module 20 as a recommendation, as indicated by line 50. The event processor module 20 subsequently updates the contents of storage device 12 by modifying the call and technician sets of the domain model according to the event, and by modifying the assignment set according to the recommendation returned by A/S module 14, as indicated by line 52. The event processor module 20 then processes the next event dequeued from queue 38.

Figure 2:
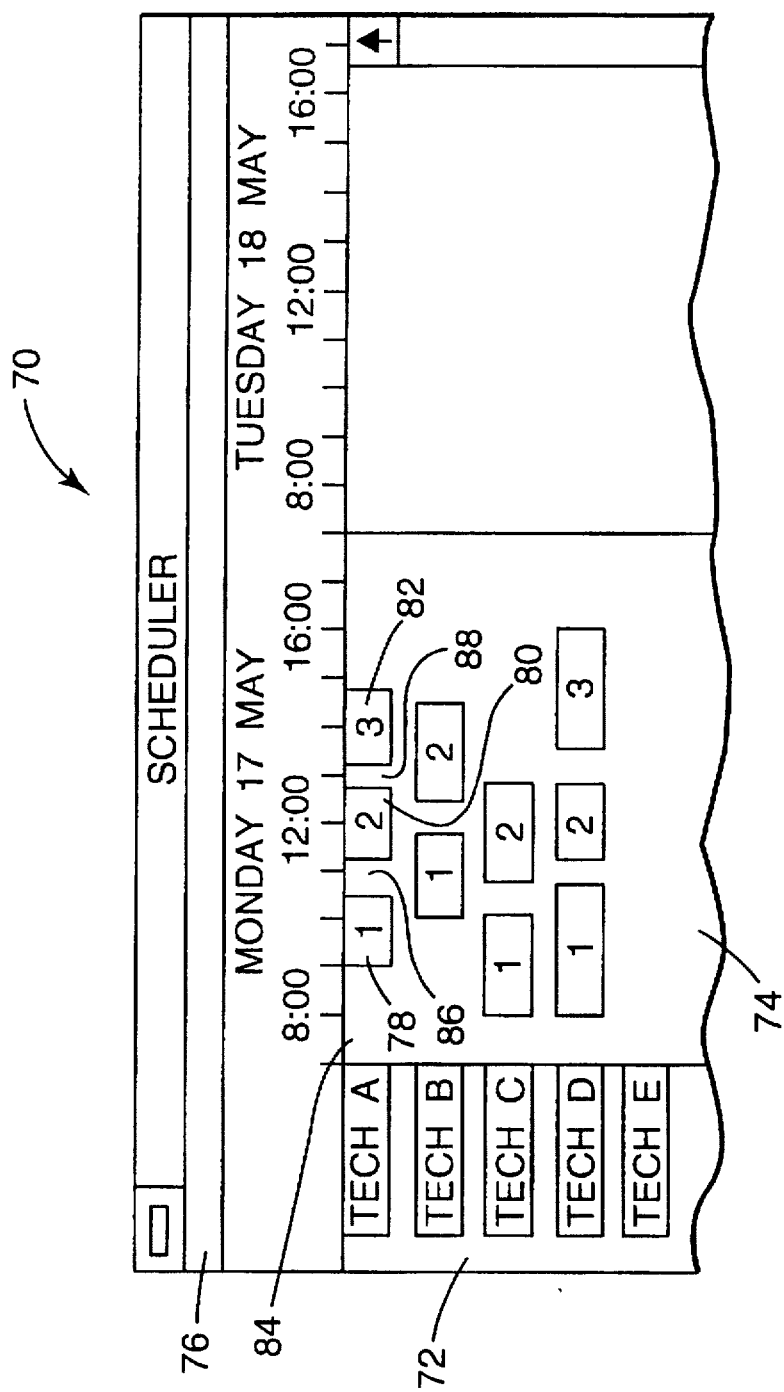
FIG. 2 is an example of a user interface displaying a graphical representation of decisions generated by the system of the present invention.

The system 10 also notifies system users of the A/S recommendation via user interfaces 36. FIG. 2 is an example of a graphical representation of a set of schedules generated by A/S module 14, as displayed by user interface 36. The user interface 36 may be implemented, for example, using X-Windows, and preferably displays an interactive scheduler window 70 containing a representation of the schedules for selected technicians. The scheduler window 70 includes a technician field 72 containing a representation of a particular group of technicians under evaluation by the system user, a schedule field 74 containing a representation of the calls assigned to each of the technicians and the particular times for which the calls are scheduled, and a command bar 76 containing representations of standard window control commands.

In FIG. 2, the technician field 72 displays a group of technicians A, B, C, D, and E operating in the field service environment. The schedule field 74 represents the existing schedules of the technicians, as generated by the A/S module 14, subject to approval or modification by the system user. The schedule field 74 in FIG. 2 indicates that technician A has been assigned first, second, and third scheduled calls represented by call blocks 78, 80, and 82. The schedule field 34 also includes time blocks 84, 86, 88 representing travel times between successive calls. A technique for determining call durations and travel times is described in detail in copending U.S. patent application Ser. No. 08/210,678, of John E. Collins and Elizabeth M. Sisley, filed Mar. 18, 1994, and entitled "SYSTEM AND METHOD FOR SCHEDULING RESOURCE REQUESTS," the content of which is incorporated herein by reference.

When the dequeued event is a change-call-event, change-territory-coverage-event, or add-unavailable-time-event, event processor module 20 updates the resource domain model in storage device 12 by modifying the call set or technician set according to the event, but requests a recommendation from A/S module 14 only if the event affects the current schedules in the schedule set of the resource domain model. The event processor module 20 refers to the assignment and schedule sets of the resource domain model, as indicated by line 52, to determine whether the nature of the domain event dictates a request for an assignment and scheduling recommendation. Specifically, an event requires an assignment and scheduling recommendation when the update to the resource domain model results in significant changes to the scheduled times of other calls, or renders current assignments invalid.

When the dequeued event is an assignment-event, event processor module 20 updates the resource domain model in storage device 12 by adding the committed call to the schedule of the particular technician. However, event processor module 20 does not request an assignment and scheduling recommendation from A/S module 14 if the assignment-event is consistent with an outstanding recommendation. In this case, the change in the status of the call does not affect the assignment or scheduling of other calls. If the assignment-event overrides a recommendation by A/S module 14, a recommendation may be necessary for affected calls or technicians. When the dequeued event is a clear-call-event, event processor module 20 does not request an assignment and scheduling recommendation, and updates the resource domain model only if the actual completion time of the call is significantly different than the scheduled completion time. The event processor module 20 determines whether the actual and scheduled completion times are significantly different by comparing the difference between the time-stamp of the event and the scheduled completion time to a predetermined time interval. The event processor module 20 ascertains the difference by reference to the schedule contained in the resource domain model in storage device 12.

The tech-events and call-events received from SMS interface 34 and user interfaces 36 are "external" events in the sense that they are real world events generated outside of the software process of system 10. The event processor module 20 also generates "internal" events during the real-time mode that drive certain actions. For example, event processor module 20 generates a midnight-event that activates a function for reading an organizational change database (not shown). This database stores any daily changes made to the resource domain model by the service organization. In response to a midnight-event, event processor module 20 reads the contents of the organizational change database and incorporates any changes by updating the resource domain model. The midnight-event derives its name from the expectation that event processor module 20 would be triggered on a daily basis, at midnight, for example, to process any organizational changes. The currency of the resource domain model in storage device 12 thereby is maintained. Additional internal events in the real-time mode may include various trigger-events that prompt event processor module 20 to send a reminder message to a system user via user interfaces 36 at a particular time.

The operation of system 10 in the discrete-event simulation mode will now be described. Before the simulation mode is initiated, the domain status file 28 is accessed to obtain a domain status record. The domain status record is created by dumping the contents of storage device 12 into the record at a particular time, as indicated by line 54. Thus, the domain status file 28 may store several domain status records representing the contents of the resource domain model in storage device 12 at various times. The status records can be distinguished, for example, by title and/or date information. To start the simulation mode, the system user retrieves one of the status records in domain status file 28 and loads its contents into the storage device 12. If the system user wishes to retain real-time assignment and scheduling capability during simulation, the data structure of the resource domain model can be replicated and its contents loaded into another storage device for independent use by a separate simulation process.

In the simulation mode, simulated event generator module 18, event processor module 20, and simulation controller module 22 cooperate to generate simulated domain events and to control the progression of simulated time produced by simulation clock 24. The simulated domain events represent simulated changes to either the technician set or call set of the resource domain model. The simulated event generator module 18 provides a source of "external" simulated events, generated outside of the simulation process of event processor module 20. The event processor module 20 generates additional, "internal" simulated events necessary to complete the simulation. The external events produced by simulated event generator module 18 may include a tech-event such as an assignment-event, an unassignment-event, a change-territory-coverage-event, or an add-unavailable-time-event, or a call-event such as a new-call-event, a cancel-call-event, or a change-call-event. However, simulated event generator module 18 will not produce a clear-call-event representing the completion of a call by a technician because such an event is directly affected by recommendations issued by A/S module 14 during the simulation. Specifically, assignment and scheduling recommendations result in modifications of the assignment and schedule sets that involve reassignment or rescheduling of particular calls. Thus, the completion time for a particular call is uncertain at the time event processor module 20 initially receives a new-call-event, and cannot be determined until A/S module 14 issues a recommendation.

Figure 3:
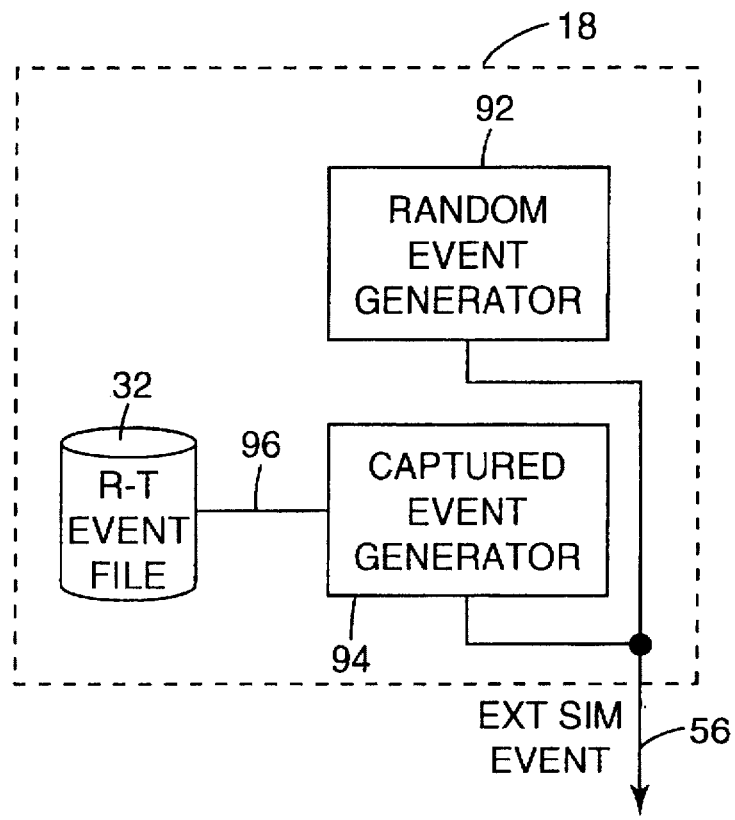
FIG. 3 is a block diagram illustrating the simulated event generator module of the system shown in FIG. 1, in accordance with the present invention.

As shown in FIG. 3, simulated event generator module 18 includes two alternative sources of external simulated events provided by a random event generator 92 and a captured event generator 94. The random event generator 92 generates domain events based on a random function. The randomly-generated events can be time-stamped as they are generated to represent the progression of simulated time. The captured event generator 94 accesses a real-time event record in real-time event file 32, as indicated by line 96, and replays its contents as a captured domain event. The captured events provide a record of the events received by event processor module 20 during an actual run of the real-time mode. However, some assignment and scheduling recommendations issued during the simulation mode by A/S module 14 will vary from those approved by a system user during the real-time mode, resulting in different completion times for certain calls. Therefore, captured event generator 94 should be configured to replay only those recorded events that are appropriate for the purpose of the simulation such as events that do not involve the completion of a call.

A captured domain event includes the time-stamp affixed by event processor module 20 indicating the time at which it was originally recorded, as well as the relevant call and/or technician attributes originally received with the event. Thus, the simulation mode of system 10 produces more than a simple simulation of a generic load on the resources, actually modeling the information needed to represent the real world. The simulated event generator module 18 sends the external events to the priority-ordered queue 38 associated with event processor module 20, as indicated by line 56 of FIG. 1. In FIGS. 1 and 3, the external simulated events are denoted by the label "EXT SIM EVENT." As in the real-time mode, event processor module 20 takes appropriate action in response to each external event received from simulated event generator 18 based on the handle-event function. For example, event processor module 20 passes the external event to A/S module 14 if an assignment and scheduling recommendation is necessary, and updates the contents of the resource domain model in storage device 12 when appropriate.

The event processor module 20 also generates the additional, internal events necessary to simulate progress of the activities of technicians in the field. The event processor module 20 generates the internal events based on external events received from simulated event generator module 18 and recommendations issued by A/S module 14. For example, when an external new-call-event is dequeued from queue 38, event processor module 20 passes the external event to A/S module 14 for a recommendation. After receiving the A/S recommendation and updating the domain model, event processor module 20 references the schedule set. If the recommendation results in the scheduling of the call at the beginning of a technician's schedule, event processor module 20 generates a clear-call-event representing the completion of the scheduled call. The event processor module 20 affixes a time-stamp to the clear-call-event corresponding to a scheduled completion time for the call. The scheduled completion time is determined based on an expected duration of the call relative to its scheduled start time, as stored in a duration file, or based on an actual duration stored in the event record for a captured event. The clear-call-event forces the termination of simulated activities that should have been finished by the technician at a particular simulated time, and triggers the start of the next service call. In this manner, the simulated technician can move on to the next call. If the call is scheduled at a later time on the technician's schedule, and is preceded by a significant amount of idle time, event processor module 20 generates a wake-up-event with a time-stamp corresponding to the start time of the call. The wake-up-event, in effect, activates the simulated technician to whom the call is assigned at the appropriate time. If the call is not scheduled first on the technician's schedule, and is preceded by other scheduled calls, event processor module 20 generates the clear-call-event in response to the receipt of a clear-call-event for the immediately preceding call. In this case, the completion time represented by the time-stamp on the clear-call-event is computed based on the expected duration of the call relative to the completion time of the preceding call, and any intervening travel time between the calls.

The event processor module 20 records both the external and internal simulated events as simulated event records in simulated event file 30 for future analysis, as indicated by line 60. The internal events are also passed to a time-ordered queue 58 associated with event processor module 20 for incorporation in the simulation, as indicated by line 62. In FIG. 1, the internal simulated events are denoted by the label "INT SIM EVENT." The time-ordered structure of queue 58 requires that internal events having the earliest time-stamps are dequeued first. The simulation controller module 22 is responsible for controlling simulation clock 24 and managing time-ordered queue 58. As indicated by line 64 of FIG. 1, event processor module 20 passes the time-stamp of each external event dequeued from priority-ordered queue 38 to simulation controller module 22 as a clock control event. The simulation controller module 22 controls simulated clock 24, as indicated by line 66, by driving simulated time forward based in part on the time-stamps of the clock control events. As a result, the external events from priority-ordered queue 38 and internal events from time-ordered queue 58 can be properly interleaved to support the capability of system 10 to operate the simulation with captured real-time events. As indicated by line 68, simulation controller module 20 manages time-ordered queue 58 by dequeueing internal events when simulated time reaches the time-stamps on the respective events. The dequeued internal events are thus submitted to event processor module 20 for appropriate action, thereby incorporating the internal events in the simulation.

The operation of event processor module 20 and simulation controller module 22 can be defined by three classes of data objects and associated functions. The EVENT class relates to the processing of external and internal events by event processor module 20 and simulation controller module 22. The EVENT class comprises a transaction-time function and the handle-event function. The transaction-time function returns the time-stamp of a particular event for use by event processor module 20 or simulation controller module 22. In the simulation mode, the handle-event function matches an internal or external event with an appropriate action to be taken by event processor module 20, such as updating the domain model, generating further internal events, and requesting an A/S recommendation. The handle-event function returns the appropriate action to event processor module 20 based on the event type.

The QUEUE class relates to the management of priority-ordered queue 38 and time-ordered queue 58 by event processor module 20 and simulation controller module 22. This class includes an enqueue function, a dequeue function, a queue-first function, and a queue-not-empty function. The enqueue function passes each external event generated by simulated event generator module 18 to priority-ordered queue 38, and each internal event generated by event processor module 20 to time-ordered queue 58. The enqueue function places the event among the other events in the respective queue based on the structure of the queue. According to the priority-ordered structure of queue 38, for example, the highest priority event must be dequeued first, regardless of the order in which the events were enqueued. In contrast, the time-ordered structure of queue 58 requires that internal events are to be dequeued in ascending order of their transaction-times, with the lowest transaction-time being chronologically the earliest. The dequeue function removes the first event from the respective queue 38, 58 to which it is applied, and passes the event to event processor module 20. Thus, when applied to priority-ordered queue 38, the dequeue function removes the event having the highest priority and, when applied to time-ordered queue 58, removes the event having the lowest transaction-time. The enqueue function may order events having the same priority or transaction-time in a first-in-first-out manner. In such a case, the dequeue function would dequeue the events in the order in which they were enqueued. The queue-first function of the QUEUE class returns, but does not remove, the first event in the respective queue 38, 58. Finally, the queue-not-empty function simply returns the condition of whether priority-ordered queue 38 or time-ordered queue 58, respectively, contains any events.

The SIMULATION CONTROL class relates both to the control of simulation clock 24 by simulation controller module 22 and the processing of internal and external events by event processor module 20 as simulated time advances. This class includes a time-now function, and an update-simulation-clock function. The time-now function returns the current simulated time of simulation clock 24. The update-simulation-clock function drives simulation clock 24 forward in response to certain external events dequeued from queue 38, and dequeues each internal event in time-ordered queue 58 having a transaction-time less than the transaction-time of such an external event. The update-simulation-clock function thereby interleaves the internal events in time-ordered queue 58 with the external events dequeued from priority-ordered queue 38. The operation of event processor module 20 and simulation controller module 22 of system 10 in implementing the update-simulation-clock function can be represented by the following segment of pseudo code:

```
when new-time > time-now
    loop while queue-not-empty(time-ordered-queue) and
        transaction-time(queue-first(time-ordered-queue)) <=
        new-time
    do
        next-event := dequeue(time-ordered-queue);
            when transaction-time(next-event) > time-now
                time-now := transaction-time(next-event);
            handle-event(next-event);
    time-now := new-time;
    next-event := dequeue(priority-ordered-queue);
    handle-event(next-event);
```

In the above code segment, new-time is set to the value of the transaction-time for the first external event in priority-ordered queue 38. The transaction-time can be determined by invoking a function transaction-time(queue-first(priority-ordered-queue)) that returns the transaction-time of the first external event in priority-ordered queue 38 without dequeueing the event. The first event in priority-ordered queue 38 has the highest priority. The event processor module 20 passes the resulting transaction-time, new-time, to the simulation controller module 22 as a clock control event, as indicated by line 64. A loop is initiated when the first external event in priority-ordered queue 38 has a transaction-time, new-time, greater than the value of simulation clock 24, time-now. The function transaction-time (queue-first(time-ordered-queue)) returns the transaction-time of the first event in time-ordered queue 58 without dequeueing the event. The first event in time-ordered queue 58 has the lowest transaction-time. The operations contained in the loop are then carried out subject to the conditions that time-ordered queue 58 is not empty and the transaction-time of the first event in queue 58 is less than new-time. If either of the conditions is not satisfied, simulation controller module 24 updates simulation clock 24, as indicated by line 66, such that time-now is equivalent to new-time, and waits for the next clock control event from event processor module 20. The event processor module 20 then dequeues the first event from priority-ordered queue 38 as next-event and takes appropriate action based on the handle-event function. The process is repeated for the next external event in priority-ordered queue 38.

If both conditions are satisfied, however, simulation controller module 22 invokes the dequeue function to remove the first internal event from time-ordered queue 58 as next-event, and determines the transaction-time of the dequeued event. If the transaction-time of next-event is greater than the current simulated time, time-now, simulation controller module 22 updates simulation clock 24, such that time-now is equivalent to the transaction-time of next-event. The event processor module 20 invokes the handle-event function to take appropriate action with respect to next-event. The simulation controller module 22 then repeats the loop for the next event in time-ordered queue 58, provided that the queue is not empty and the transaction-time of the event is less than or equal to new-time. The simulation controller module 22 again dequeues the first event as next-event and updates simulation clock 24 if the transaction-time of next-event is greater than time-now. The dequeued event is then handled by event processor module 20 according to the handle-event function. The simulation controller module 22 repeats the process of dequeueing internal events and updating simulation clock 24 as long as time-ordered queue 58 continues to yield events having transaction-times less than new-time. When no such events remain in time-ordered queue 58, simulation controller module 22 updates time-now to new-time.

Figure 4:
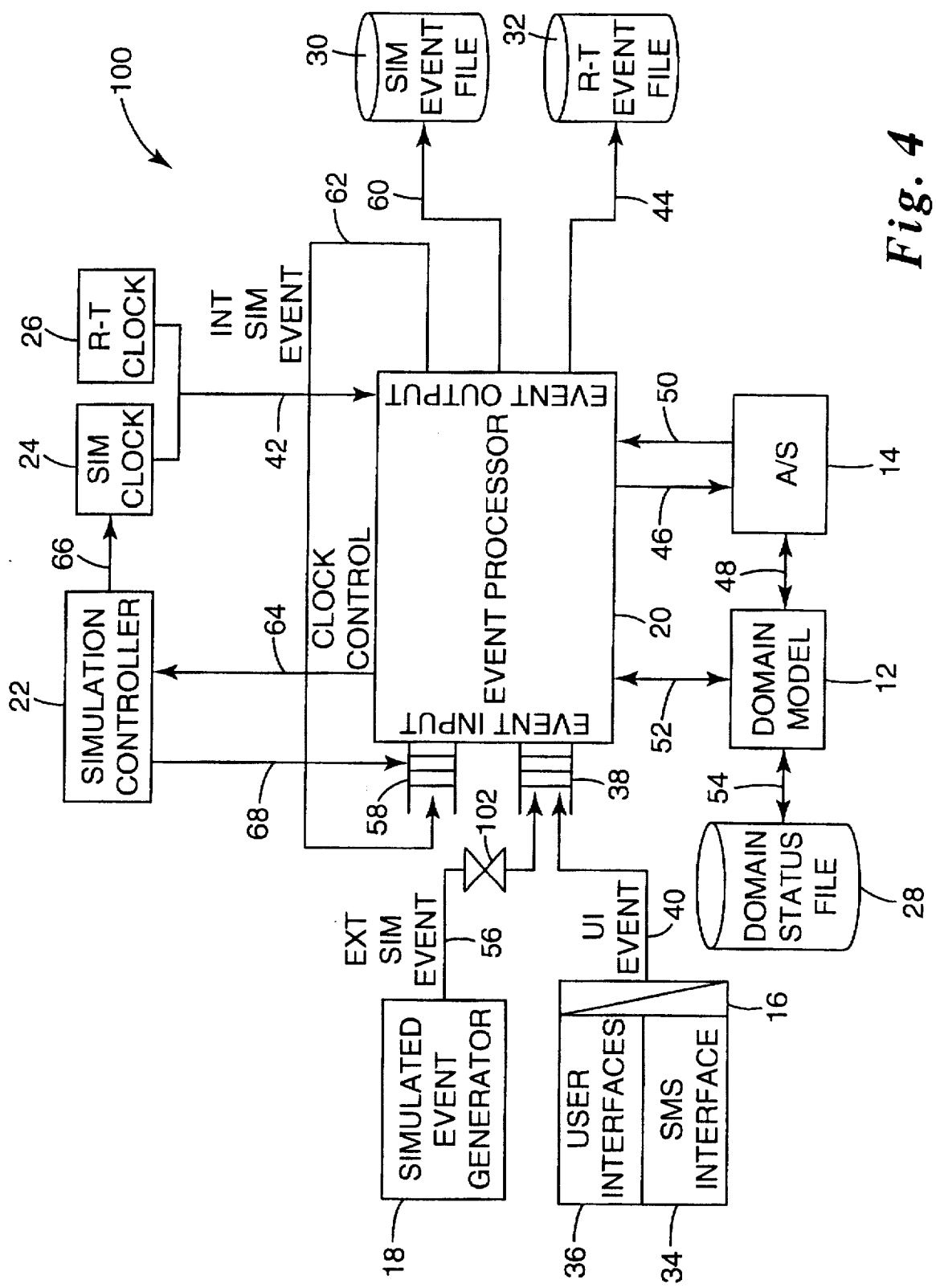
FIG. 4 is a block diagram illustrating a second embodiment of a system for integrating active and simulated decisionmaking processes, in accordance with the present invention.

FIG. 4 is a block diagram of a second embodiment of a system for integrated resource assignment and simulation in accordance with the present invention. The system 100 shown in FIG. 4 substantially corresponds to system 10 shown in FIG. 1. For example, the operation of system 10 and system 100 in the real-time mode is identical. In the simulation mode, however, system 100 is configured to control the rate of advance of simulated time in order to accommodate the participation of system users in the simulation mode. Like system 10, system 100 includes a system interface 16 comprising SMS interface 34 and user interfaces 36. In addition to serving as a source of real-time events, user interfaces 36 provide user input events for incorporation in the simulation mode. Specifically, as indicated by line 40, user interfaces 36 pass user input events to priority-ordered queue 38 via system interface 16 to be interleaved with the external simulated events produced by simulated event generator module 18. In FIG. 4, the user input events provided by user interfaces 36 are denoted by the label "UI EVENT."

Examples of various user input events include (1) the reevaluate-call-event representing a request for further consideration of an outstanding recommendation for a particular call, (2) the reevaluate-tech-event representing a request for further consideration of the outstanding recommendation for a particular technician, (3) the assignment-event representing the commitment of a recommended call to a technician, (4) the unassignment-event representing the retraction of a committed assignment from a technician, (5) a change-territory-coverage-event representing a change in the preferred service territory for a technician, and (6) an add-unavailable-time-event representing an appointment rendering a particular technician unavailable. As in the real-time mode, event processor module 20 takes appropriate action with respect to each user input event based on the handle-event function. In a modified simulation mode of system 100, the user input events may also include (7) the clear-call-event representing the completion of a call by a technician. In this case, event processor module 20 does not produce internal clear-call-events, but rather requires user input to simulate the completion of a call.

Each of the user input events is associated with a priority relative to one another and relative to the external simulated events generated by simulated event generator module 18. To enable incorporation of the user input events in the priority-ordered queue 38 during simulation, system 100 incorporates an external-event-input function and a clock-advance function. The external-event-input function, which forms part of the process of simulated event generator module 18, prevents external events from being enqueued on priority-ordered queue 38 until simulated time catches up to the transaction-times of the events. Without the external-event-input function, simulated event generator module 18 would pass all of the events sequentially read from real-time event file 32 into priority-ordered queue 38 as quickly as they can be read. The external-event-input function effectively acts as a throttle, as indicated by symbol 102 of FIG. 4, to limit the number of captured events enqueued in queue 38. This throttle effect ensures that internal events are interleaved with external events at the appropriate simulated time, and reduces the amount of processing required to maintain the priority-ordered structure of queue 38 each time a new event is enqueued. The clock-advance function, which forms part of the process performed by simulation clock 24, uses a clock-limit, clock-increment, and a delay to prevent simulated time from overtaking user input. The clock-advance function slows the advancement of simulation clock 24 to provide an appearance of accelerated, slowed, or real-time performance, enabling user interaction with the simulation. The values of clock-increment and delay are freely-adjustable by the system user to adapt the rate of the simulation to individual needs. As will be described, the effect of the external-event-input and clock-advance function is that the stream of simulated events never overtakes simulated time, no event is handled before its simulated time arrives, and during periods when no simulated events are available, simulated time advances at a controlled rate, rather than simply jumping ahead to the next event.

The operation of system 100 in the discrete-event simulation mode can be represented by three separate processes and three time values. Specifically, system 100 carries out the external-event-input function of simulated event generator module 18, the clock-advance function of simulation clock 14,. and a modified event-process function cooperatively performed by event processor module 20 and simulation controller module 22. The functions operate relative to the time values time-now, next-input-time, and clock-limit. The operation of the external-event-input function of simulated event generator module 18 can be represented by the following pseudo code segment:

loop while not-end-of-event-file do
    external-event := read(event-record);
    if transaction-time(external-event) > time-now
        next-input-time := transaction-time(external-event);
        wait (time-now >= next-input-time)
        enqueue(priority-ordered-queue, external-event);

The operation of the clock-advance function of simulation clock 24 can be represented by the following pseudo code segment:

```
loop
    wait (time-now >= clock-limit)
    sleep(delay);
    clock-limit := clock-limit + clock-increment;
```

Finally, the operation of the event-process function of event processor module 20 and simulation controller module 22 can be represented by the following pseudo code segment:

```
loop
    wait (a := queue-not-empty(priority-ordered-queue)
       or b := (next-input-time < clock-limit)
       or c := (clock-limit > time-now))
    when a: next-event := dequeue(priority-ordered-queue);
        update-simulation-clock(transaction-time(next-
            event));
        handle-event(next-event);
    b: update-simulation-clock(next-input-time);
    c: update-simulation-clock(clock-limit);
```

Figure 5:
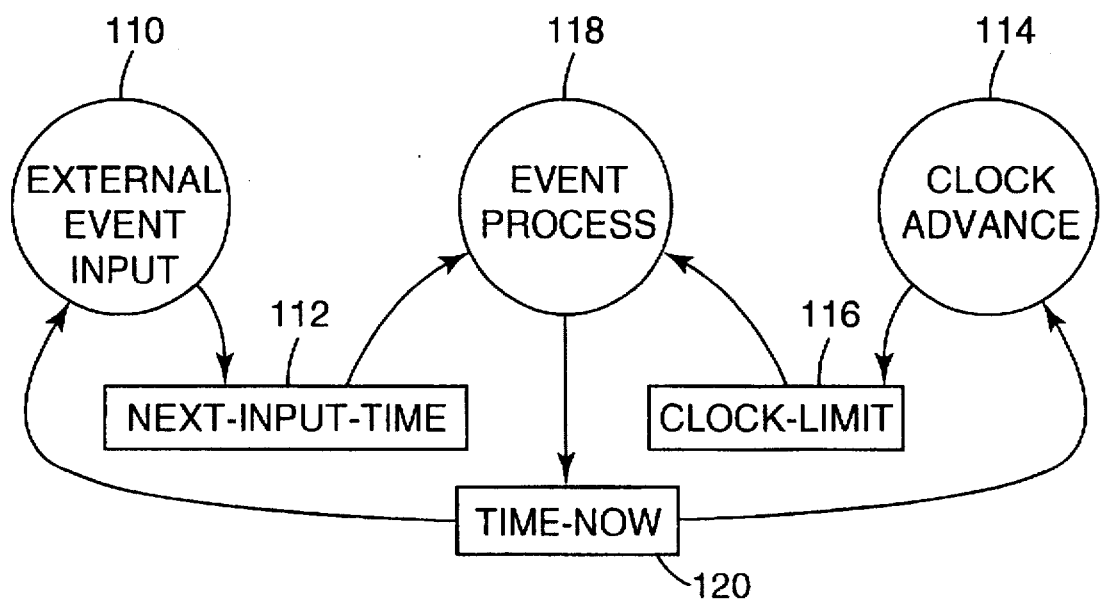
FIG. 5 is a software process diagram illustrating the operation of the system shown in FIG. 3, in accordance with the present invention.

As indicated by the above pseudo code segments, the cooperative operation of the external-event-input, clock-advance, and event-process functions relies on the values of time-now, next-input-time, and clock-limit. The software process diagram of FIG. 5 illustrates this relationship. As shown, the external-event-input function 110 determines the value of next-input-time 112, and the clock-advance function 114 determines the value of clock-limit 116. The values of next-input-time 112 and clock-limit 116 drive the operation of the event-process function 118. In turn, the event-process function 118 determines the value of time-now 120, which drives the operation of both the external-event-input function 110 and the clock-advance function 114.

The external-event-input function of simulated event generator module 18 continuously reads captured event records from real-time event file 32 to produce external simulated events as long as the end of the file has not been reached. If the transaction-time of an external event is greater than time-now, then next-input-time is set to the transaction-time. However, none of the external events read by simulated event generator module 18 is enqueued in queue 38 until simulated time, time-now, is greater than or equal to the next-input-time. This condition serves as the throttle mechanism, which prevents the enqueueing of external events until simulated time catches up to the transaction-times of the events.

The clock-advance function ensures that simulated time does not jump far ahead in a single increment, but rather progresses at a controlled rate. The clock-advance function waits for a condition that time-now is greater than or equal to the clock-limit. When this condition is satisfied, the clock-advance function sleeps for an amount of time equal to a user-defined delay, and updates the clock-limit by an increment defined by the user. In this manner, the simulated time, time-now, produced by simulation clock 24 advances at a controlled rate.

The event-process function of event processor module 20 and simulation controller module 22 waits for one of three conditions to occur. Specifically, the event-process function waits for a condition that a. priority-ordered queue 38 is not empty, b. the value of next-input-time, determined by the external-event-input function, is less than the prevailing clock-limit, determined by the clock-advance function, or c. the clock-limit is greater than time-now, the present simulated time. When any one of the conditions a–c is satisfied, the event-process function initiates an operation directed by the condition. For example, when priority-ordered queue 38 contains one or more events, satisfying condition a, the event-process function dequeues the first event in the queue as next-event, invokes the update-simulation-clock function with the argument transaction-time(next-event), and invokes the handle-event function to take appropriate action with respect to the event, such as updating schedules, requesting a recommendation from A/S module 14, and generating additional, internal events. The update-simulation-clock function of system 100 is identical to that described above with respect to system 10. Condition a will be satisfied whenever an external simulated event from simulated event generator module 18 is enqueued in queue 38 subject to the external-event-input function, or when a user input event from system interface 16 is enqueued. When next-input-time is less than clock-limit, satisfying condition b, the event-process function invokes the update-simulation-clock function with the argument next-input-time for new-time, to thereby update the value of time-now to the value of next-input-time. This update of time-now allows the external-event-input function to proceed. Finally, when clock-limit is greater than time-now, satisfying condition c, the event-process function invokes the update-simulation-clock function with the argument clock-limit for new-time, to thereby update the value of time-now to the value of clock-limit. This update of time-now allows the clock-advance function to proceed.

Figure 6:
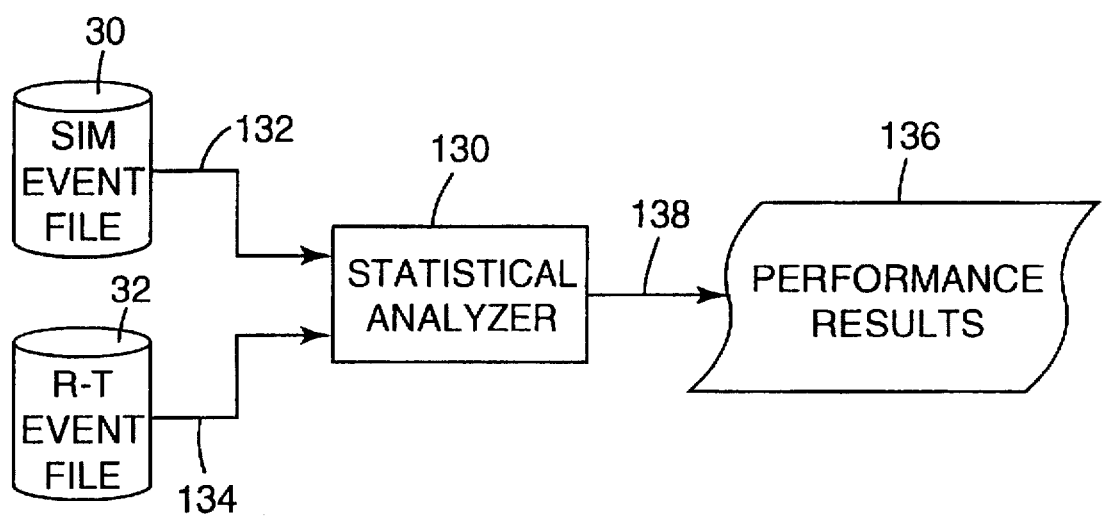
FIG. 6 is a block diagram illustrating a statistical analyzer for incorporation in the systems of FIGS. 1 and 4, in accordance with the present invention.

FIG. 6 is a block diagram illustrating a statistical analyzer 130 for incorporation in system 10 of FIG. 1 or system 100 of FIG. 4, in accordance with the present invention. The statistical analyzer 130 compares simulated system performance with real-time system performance to provide a measure of the effectiveness of the A/S recommendations issued by A/S module 14, or to compare different versions of the domain model representing different organizational changes. For a single domain model, statistical analyzer 130 compares real-time event records to simulated event records. To analyze different versions of the domain model, statistical analyzer 130 compares real-time event records generated based on each model, or compares simulated event records generated based on each model. The real-time results inevitably vary from those in the simulation mode due to the presence of a system user who will sometimes override an A/S recommendation issued by A/S module 14 as being unacceptable. Thus, for analysis, the simulation mode typically is run only on the recommendations of A/S module 14 and does not include decisions made by the system user.

For comparison, the simulation mode is run using a set of captured real-time event records stored in real-time event file 32. After the simulation mode is completed for a desired period of time, statistical analyzer 130 retrieves the resulting simulated events from simulated event file 30, as indicated by line 132, and the captured real-time events used in the simulation from real-time event file 32, as indicated by line 134. The statistical analyzer 130 then computes various parameter values to provide a measure of relative performance, and generates a hard or soft copy of a performance report 136, as indicated by line 138. Useful performance parameters computed by statistical analyzer 130 may include the percentage of calls completed on the same day on which they were scheduled, the average tardiness of technicians relative to scheduled start times, the average response time of technicians from the initiation times for the calls received, and the average travel time for technicians between consecutively scheduled calls.

As an example, statistical analyzer 130 may compare the travel times resulting from user decisions in the real-time mode to the travel times resulting from A/S recommendations generated exclusively by A/S module 14 during the simulation mode. In this case, each real-time event record in real-time event file 32 and simulated event record in simulated event file 30 representing a new-call-event includes a start time for a call, a completion time for the call, and a travel time between successively scheduled calls. The A/S module 14 computes the average travel time between all calls in the real-time mode, and then runs a linear regression on the travel time versus the distance separating respective calls. The linear regression produces delay and speed values. The statistical analyzer 130 then uses the delay and speed values to compute travel times between calls during the simulation mode. The simulation mode is then run and the results stored by producing a set of simulated event records in simulated event file 30. After computing the average travel times between calls in the simulation mode, the statistical analyzer 130 produces a report 136 comparing the average travel times in the real-time and simulated modes of operation. Because the simulation mode was run with no user input, the average simulated travel time reflects the performance of A/S module 14.

Figure 7:
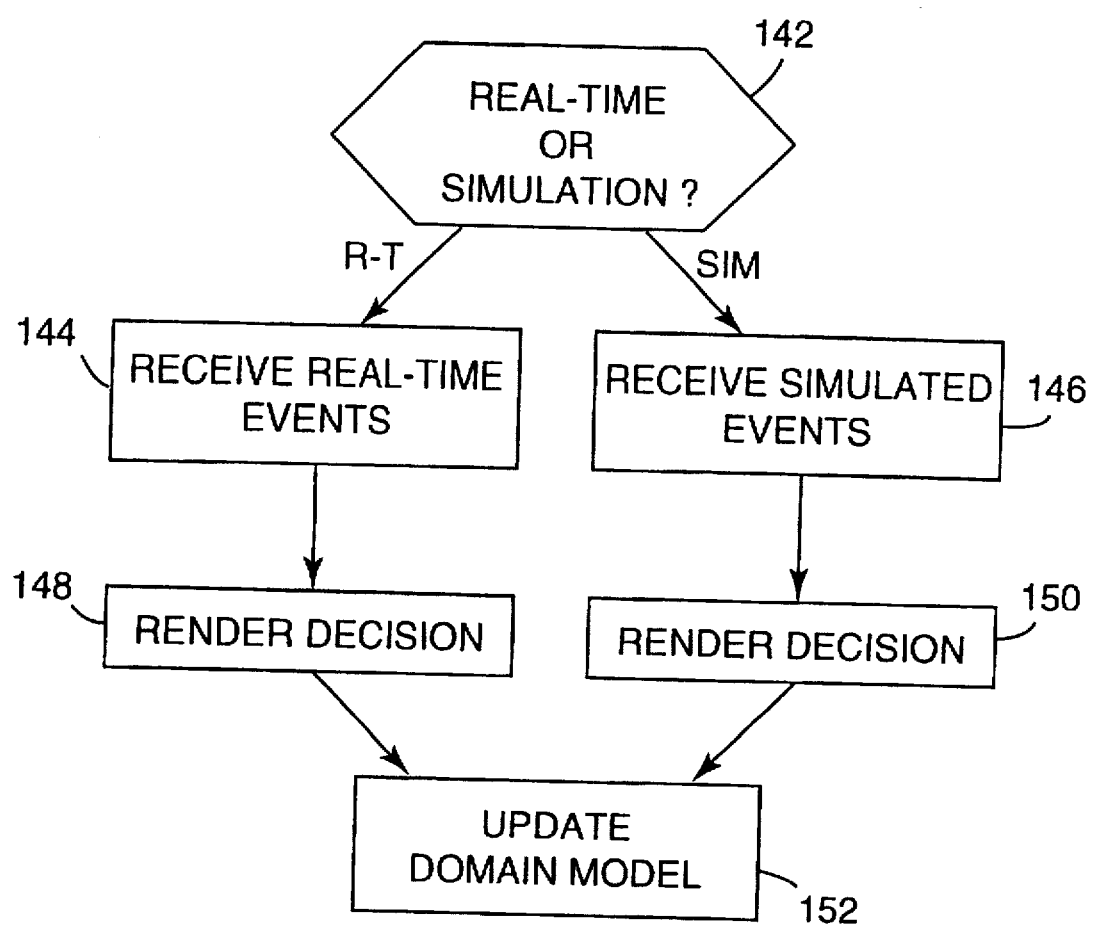
FIG. 7 is a low diagram illustrating the operation of a method for integrating real-time and simulated decision making processes in a computer-based system, in accordance with the present invention.

FIG. 7 is a flow diagram illustrating the operation of a method for integrating real-time and simulated decision making processes in a computer-based system, in accordance with the present invention. This method may be implemented in conjunction with the computer-based system described above with respect to FIGS. 1–6. According to this method, a representation of a domain model is stored. The domain model represents a decision making domain and the decision making domain contains a plurality of diverse object sets and a relational set defining relationships between one or more of the objects in the diverse object sets. As shown it FIG. 7, for operation of the method, one of a real-time mode of operation and a simulation mode of operation is selected, as indicated by block 142. If the real-time mode is selected, real-time events are received, is indicated by block 144. Each of the real-time events represents an actual change to one of the diverse object sets. If the simulation mode is selected, simulated events are received, as indicated by block 146. Each of the simulated events represents a simulated change to one of the diverse object sets. In the real-time mode, decisions are generated in response to the real-time events, as indicated by block 148. In the simulated mode, decisions are generated in response to the simulated events, as indicated by block 150. Each of the decisions represents a change to the relational set, As indicated by block 152, following a decision, the relational set of the stored domain model is automatically updated to include the change represented by the decision.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A method for integrating real-time and simulated decision making processes in a computer-based system, the method comprising the steps of:

storing a representation of a domain model, the domain model representing decision making domain, and the decision making domain containing a plurality of diverse object sets and a relational set defining relationships between one or more of the objects in the diverse object sets;

selecting one of a real-time mode of operation and a simulation mode of operation;

receiving real-time events if real-time mode is selected, each of the real-time events representing an actual change to one of the diverse object sets;

receiving simulated events if simulation mode is selected, each of the simulated events representing a simulated change to one of the diverse object sets;

generating decisions in response to the real-time events and the simulated events, each of the decisions representing a change to the relational set; and automatically updating the relational set of the domain model stored to include the changes represented by the decisions.

2. The method of claim 1 further comprising the step of generating the simulated events.

3. The method of claim 1 wherein the decision making domain represents a field service domain, the field service domain containing a set of service technicians, a set of service calls, and an assignment set defining assignments of one or more of the service calls among the service technicians, and wherein each of the changes to the diverse object sets represents a change to one of the set of service technicians and the set of service calls, and further wherein each of the decisions represents a change to the assignment set.

4. A computer-implemented system for integrating active and simulated decisionmaking processes, said system comprising:

a storage device storing a representation of a domain model, said domain model representing a decisionmaking domain, and said decisionmaking domain containing a plurality of diverse object sets and a relational set defining relationships between one or more of the objects in said diverse object sets;

a decisionmaking module for generating decisions in response to domain events, each of said domain events representing a change to one of said diverse object sets over a period of time, and each of said decisions representing a change to said relational set;

a system interface for receiving real-time events, each of said real-time events representing an actual change to one of said diverse object sets over a period of real time;

a simulated event generator module for generating simulated events, each of said simulated events representing a simulated change to one of said diverse object sets over a period of simulated time; and an event processor module including:

means for receiving said real-time events from said system interface and said simulated events from said simulated event generator module, means for selecting one of a real-time mode of operation and a simulation mode of operation, means for passing one or more of said real-time events to said decisionmaking module as domain events when said real-time mode is selected, means for generating, when said simulation mode is selected, additional simulated events in response to said simulated events received from said simulated event generator module, means for interleaving said simulated events received from said simulated event generator module and one or more of said additional simulated events generated by said event processor module, and for passing the interleaved simulated events and additional simulated events to said decisionmaking module as domain events when said simulation mode is selected, and means for updating said relational set of said domain model stored in said storage device to include said changes represented by said decisions generated by said decisionmaking module.

5. The system of claim 4, wherein said plurality of diverse object sets includes a set of resource requests and a set of resource providers and said relational set is defined by assignments of one or more of said resource requests among said resource providers.

6. The system of claim 5, wherein each of said resource requests is a field service call, and each of said resource providers is a field service technician.

7. The system of claim 4, wherein said simulated event generator module includes means for randomly generating domain events, and means for passing the randomly generated domain events to said event processor module, said event processor module passing one or more of said randomly generated domain events to said decisionmaking module as domain events when said simulation mode is selected.

8. The system of claim 7, wherein said plurality of diverse object sets includes a set of resource requests and a set of resource providers and said relational set is defined by assignments of one or more of said resource requests among said resource providers.

9. The system of claim 8, wherein each of said resource requests is a field service call, and each of said resource providers is a field service technician.

10. The system of claim 4, wherein:

said event processor module includes means for storing said real-time events received from said system interface in a real-time event file, and said simulated event generator module includes means for retrieving said stored real-time events from said real-time event file, and means for passing said stored real-time events to said event processor module, said event processor module passing one or more of said stored real-time events to said decisionmaking module as domain events when said simulation mode is selected.

11. The system of claim 10, wherein said plurality of diverse object sets includes a set of resource requests and a set of resource providers and said relational set is defined by assignments of one or more of said resource requests among said resource providers.

12. The system of claim 11, wherein each of said resource requests is a field service call, and each of said resource providers is a field service technician.

13. The system of claim 10, wherein said means for passing said simulated events and said additional simulated events to said decisionmaking module includes a first queue for receiving said simulated events from said simulated event generator module and a second queue for receiving said additional simulated events from said event processor module.

14. The system of claim 13, wherein said plurality of diverse object sets includes a set of resource requests and a set of resource providers and said relational set is defined by assignments of one or more of said resource requests among said resource providers.

15. The system of claim 14, wherein each of said resource requests is a field service call, and each of said resource providers is a field service technician.

16. The system of claim 13, further comprising:

a simulation clock for generating simulated time; and a simulation controller module for controlling advancement of said simulated time generated by said simulation clock based on time-stamps associated with said simulated events generated by said simulated event generator module.

17. The system of claim 16, wherein said plurality of diverse object sets includes a set of resource requests and a set of resource providers and said relational set is defined by assignments of one or more of said resource requests among said resource providers.

18. The system of claim 17, wherein each of said resource requests is a field service call, and each of said resource providers is a field service technician.

19. The system of claim 16, wherein said simulation controller module includes means for dequeueing one or more of said additional events from said second queue to said event processor module based on said time-stamps associated with said simulated events generated by said simulated event generator module, thereby interleaving said one or more of said additional simulated events generated by said event processor module with said simulated events generated by said simulated event generator module.

20. The system of claim 19, wherein said plurality of diverse object sets includes a set of resource requests and a set of resource providers and said relational set is defined by assignments of one or more of said resource requests among said resource providers.

21. The system of claim 20, wherein each of said resource requests is a field service call, and each of said resource providers is a field service technician.

22. The system of claim 16, wherein said simulation clock includes means for controlling a rate of advancement of said simulated time to enable participation of a system user during said simulation mode, wherein said system interface includes one or more interactive user interfaces for receiving user input events from said system user, said event processor module passing one or more of said user input events to said decisionmaking module when said simulation mode is selected.

23. The system of claim 22, wherein said plurality of diverse object sets includes a set of resource requests and a set of resource providers and said relational set is defined by assignments of one or more of said resource requests among said resource providers.

24. The system of claim 23, wherein each of said resource requests is a field service call, and each of said resource providers is a field service technician.

25. The system of claim 10, further comprising:

a domain status file for storing one or more status records, each of said status records representing contents of said domain model stored in said storage device at a particular time during said real-time mode; and means, responsive in said simulation mode, for retrieving one of said status records from said domain status file, and for loading the retrieved status record into said storage device.

26. The system of claim 25, wherein said plurality of diverse object sets includes a set of resource requests and a set of resource providers and said relational set is defined by assignments of one or more of said resource requests among said resource providers.

27. The system of claim 26, wherein each of said resource requests is a field service call, and each of said resource providers is a field service technician.

28. The system of claim 4, further comprising a statistical analyzer module for comparing said decisions generated by said decisionmaking module during said real-time mode to said decisions generated by said decisionmaking module during said simulation mode based on said real-time events and said simulated events.

29. The system of claim 28, wherein said plurality of diverse object sets includes a set of resource requests and a set of resource providers and said relational set is defined by assignments of one or more of said resource requests among said resource providers.

30. The system of claim 29, wherein each of said resource requests is a field service call, and each of said resource providers is a field service technician.

31. The system of claim 4, wherein said system interface includes one or more interactive user interfaces, said system further comprising means for displaying a representation of said decisions generated by said decisionmaking module to a system user via said one or more interactive user input interfaces.

32. The system of claim 31, wherein said plurality of diverse object sets includes a set of resource requests and a set of resource providers and said relational set is defined by assignments of one or more of said resource requests among said resource providers.

33. The system of claim 32, wherein each of said resource requests is a field service call, and each of said resource providers is a field service technician.

34. A computer-implemented system for integrating active and simulated field service call assignment processes, said system comprising:
- a storage device storing a representation of a domain model, said domain model representing a field service domain, and said field service domain containing a set of service technicians, a set of service calls, and an assignment set defining assignments of one or more of said service calls among said service technicians;
- an assignment module for generating recommendations in response to domain events, each of said domain events representing a change over a period of time to one of said set of service technicians and said set of service calls, and each of said recommendations representing a change to said assignment set;
- a system interface for receiving real-time events, each of said real-time events representing an actual change over a period of real time to one of said set of service technicians and said set of service calls;
- a simulated event generator module for generating simulated events, each of said simulated events representing a simulated change over a period of simulated time to one of said set of service technicians and said set of service calls; and
- an event processor module including:
  - means for receiving said real-time events from said system interface and said simulated events from said simulated event generator module,
  - means for selecting one of a real-time mode of operation and a simulation mode of operation,
  - means for passing one or more of said real-time events to said assignment module as domain events when said real-time mode is selected,
  - means for generating, when said simulation mode is selected, additional simulated events in response to said simulated events received from said simulated event generator module,
  - means for interleaving said simulated events received from said simulated event generator module and one or more of said additional simulated events generated by said event processor module, and for passing the interleaved simulated events and additional simulated events to said decisionmaking module as domain events when said simulation mode is selected, and
  - means for updating said assignment set of said domain model stored in said storage device to include said changes represented by said recommendations generated by said assignment module.

35. The system of claim 34, wherein said simulated event generator module includes means for randomly generating domain events, and means for passing the randomly generated domain events to said event processor module, said event processor module passing one or more of said randomly generated domain events to said assignment module as domain events when said simulation mode is selected.

36. The system of claim 34, wherein:
- said event processor module includes means for storing said real-time events received from said system interface in a real-time event file, and
- said simulated event generator module includes means for retrieving said stored real-time events from said real-time event file, and means for passing said stored real-time events to said event processor module, said event processor module passing one or more of said stored real-time events to said assignment module as domain events when said simulation mode is selected.

37. The system of claim 36, further comprising:
- a domain status file for storing one or more status records, each of said status records representing contents of said domain model stored in said storage device at a particular time during said real-time mode; and
- means, responsive in said simulation mode, for retrieving one of said status records from said domain status file, and for loading the retrieved status record into said storage device.

38. The system of claim 34, wherein said means for passing said simulated events and said additional simulated events to said assignment module includes a first queue for receiving said simulated events from said simulated event generator module and a second queue for receiving said additional simulated events from said event processor module.

39. The system of claim 38, further comprising:
- a simulation clock for generating simulated time; and
- a simulation controller module for controlling advancement of said simulated time generated by said simulation clock based on time-stamps associated with said simulated events generated by said simulated event generator module.

40. The system of claim 39, wherein said simulation controller module includes means for dequeueing one or more of said additional events from said second queue to said event processor module based on said time-stamps associated with said simulated events generated by said simulated event generator module, thereby interleaving said one or more of said additional simulated events generated by said event processor module with said simulated events generated by said simulated event generator module.

41. The system of claim 39, wherein said simulation clock includes means for controlling a rate of advancement of said simulated time to enable participation of a system user during said simulation mode, wherein said system interface includes one or more interactive user interfaces for receiving user input events from said system user, said event processor module passing one or more of said user input events to said decisionmaking module when said simulation mode is selected.

42. The system of claim 34, further comprising a statistical analyzer module for comparing said recommendations generated by said assignment module during said real-time mode to said recommendations generated by said assignment module during said simulation mode based on said real-time events and said simulated events.

43. The system of claim 34, wherein said system interface includes one or more interactive user interfaces, said system further comprising means for displaying a representation of said recommendations generated by said assignment module to a system user via said one or more interactive user input interfaces.

44. The system of claim 34, wherein said system interface includes a service management system interface for receiving said domain events from a service management database, and one or more user interfaces for receiving said domain events from one or more system users.

45. The system of claim 34, wherein said assignment set includes a schedule set, said schedule set including, for each of said service technicians, a schedule of the service calls assigned to the respective service technician, and wherein said assignment module includes a scheduler module for generating recommendations representing changes to said schedule set in response to said domain events.

* * * * *

UNITED STATES PATENT AND TRADEMARK OFFICE
CERTIFICATE OF CORRECTION

PATENT NO.: 5,764,953
DATED: June 9, 1998
INVENTOR(S): John E. Collins and Elizabeth M. Sisley It is certified that error appears in the above-identified patent and that said Letters Patent is hereby corrected as shown below:

Col. 17, line 63, "representing decision" should read --representing a decision--.

Signed and Sealed this

Twentieth Day of June, 2000

Attest:

Q. TODD DICKINSON

*Attesting Officer*   *Director of Patents and Trademarks*